(12) United States Patent
Hoepken

(10) Patent No.: US 6,570,817 B2
(45) Date of Patent: May 27, 2003

(54) APPARATUS FOR DETECTING POSITION

(75) Inventor: Hermann Hoepken, Sprockhovel (DE)

(73) Assignee: K. A. Schmersal GmbH & Co., Wuppertal (DE)

(*) Notice: Subject to any disclaimer, the term of this patent is extended or adjusted under 35 U.S.C. 154(b) by 4 days.

(21) Appl. No.: 09/947,223

(22) Filed: Sep. 5, 2001

(65) Prior Publication Data

US 2002/0044499 A1 Apr. 18, 2002

Related U.S. Application Data

(63) Continuation-in-part of application No. 09/490,865, filed on Jan. 24, 2000, now abandoned.

(30) Foreign Application Priority Data

Jan. 29, 1999 (DE) .......................... 199 03 645

(51) Int. Cl.$^7$ .............................. G01S 11/14; B66B 1/34
(52) U.S. Cl. ..................... 367/124; 367/120; 187/391; 187/394
(58) Field of Search ................ 367/120, 127, 367/124; 187/391, 394; 324/207.11, 207.12, 207.15, 207.16, 207.17

(56) References Cited

U.S. PATENT DOCUMENTS

| | | | |
|---|---|---|---|
| 3,696,328 A | 10/1972 | Schwartz | |
| 4,012,588 A | 3/1977 | Davis et al. | |
| 4,035,762 A | 7/1977 | Chamuel | |
| 4,041,495 A | 8/1977 | Martin | |

(List continued on next page.)

FOREIGN PATENT DOCUMENTS

| | | |
|---|---|---|
| DE | 2610127 | 9/1977 |
| DE | 3608384 | 2/1989 |
| DE | 4229079 | 3/1994 |
| GB | 211046 A | 6/1989 |

OTHER PUBLICATIONS

European Search Report, Apr. 26, 2000, Application No. EP 00 10 0974.
European Search Report, Apr. 26, 2000, Application No. EP 00 10 0975.
European Search Report, Apr. 26, 2000, Application No. EP 00 10 0976.
Apparatus for Detecting Position, Hoepken, 09/490,647, filed Jan. 24, 2000 (12 pg).
Apparatus for Detecting Position, Hoepken, 09/489,953, filed Jan. 24, 2000 (14 pg).
Apparatus for Detecting Position, Turk, 09/490,648, filed Jan. 24, 2000 (12 pg).

Primary Examiner—Ian J. Lobo
(74) Attorney, Agent, or Firm—Patterson, Thuente, Skaar & Christensen

(57) ABSTRACT

An apparatus for detecting the position of an object moveable along a predetermined travel path. The apparatus includes an acoustic signal waveguide, a signal input coupler, at least one signal output coupler, and means for generating. The acoustic signal waveguide extends along the travel path and having a predetermined, uniform speed of propagation of sound. The signal input coupler is located on the moveable object, to couple a clocked acoustic signal into the acoustic signal waveguide. The at least one signal output coupler is arranged at one end of the acoustic signal waveguide and is connected to an evaluation unit for determining the propagation-time of the sound signal from a position at which it is coupled in to the at least one signal output coupler and for generating a signal representative of the instantaneous position of the moveable object on the travel path. The means for generating acoustic signal adjacent pulses having a varying time interval is in communication with said signal input coupler.

21 Claims, 5 Drawing Sheets

U.S. PATENT DOCUMENTS

| | | |
|---|---|---|
| 4,233,588 A | 11/1980 | Satoh |
| 4,238,844 A | 12/1980 | Ueda et al. |
| 4,375,057 A | 2/1983 | Weise et al. |
| 4,389,631 A | 6/1983 | Kajiyama et al. |
| 4,392,214 A | 7/1983 | Marini et al. |
| 4,494,224 A | 1/1985 | Morrell et al. |
| 4,606,015 A | 8/1986 | Yamaguchi |
| 5,223,680 A | 6/1993 | Schmidt-Milkau et al. |
| 5,306,882 A | 4/1994 | Gerwing et al. |
| 5,406,200 A | 4/1995 | Begin et al. |
| 5,509,505 A | 4/1996 | Steger et al. |
| 5,736,695 A * | 4/1998 | Hoepken .................. 187/394 |
| 5,883,345 A * | 3/1999 | Schonauer et al. ......... 187/394 |
| 6,311,803 B1 * | 11/2001 | Turk ........................ 187/394 |
| 6,366,532 B1 * | 4/2002 | Hoepken .................. 367/124 |

\* cited by examiner

| U-0 | W-1 | W-1 | W-1 | W-1 | W-1 | W-1 | W-1 |
|-----|-----|-----|-----|-----|-----|-----|-----|
| -   | T0CS | T0SE | PSA | PS2 | PS1 | PS0 |  |
| 7 | 6 | 5 | 4 | 3 | 2 | 1 | bit 0 |

W = Writable bit
U = Unimplemented bit
-n = Value at POR reset bit 7: Unimplemented.

bit 7-6:

bit 5: T0CS: Timer0 clock source select bit
1 = Transition on T0CKI pin
0 = Internal instruction cycle clock (CLKOUT)

bit 4: T0SE: Timer0 source edge select bit
1 = Increment on high-to-low transition on T0CKI pin
0 = Increment on low-to-high transition on T0CKI pin bit 3: PSA: Prescaler assignment bit
1 = Prescaler assigned to the WDT
0 = Prescaler assigned to Timer0 bit 2-0: PS<2:0>: Prescaler rate select bits

| Bit Value | Timer0 Rate | WDT Rate |
|-----------|-------------|----------|
| 000 | 1:2   | 1:1   |
| 001 | 1:4   | 1:2   |
| 010 | 1:8   | 1:4   |
| 011 | 1:16  | 1:8   |
| 100 | 1:32  | 1:16  |
| 101 | 1:64  | 1:32  |
| 110 | 1:128 | 1:64  |
| 111 | 1:256 | 1:128 |

Fig. 4

APPARATUS FOR DETECTING POSITION

RELATED APPLICATION

This application is a Continuation-in-Part of U.S. patent application Ser. No. 09/490,865, filed on Jan. 24, 2000, now abandoned, which claims priority to German Application No. 199 03 645.4, filed Jan. 29, 1999, and incorporated herein by reference.

FIELD OF THE INVENTION

The invention relates to an apparatus for detecting the position of an object which can move along a predefined path. Such apparatus may be used for controlling the position of a lift cage or the like and thus ensuring its positioning at predetermined stops according to floor levels.

BACKGROUND OF THE INVENTION

European Patent No. 694 792 discloses an apparatus of this type for detecting the position of a movable object which has an acoustic signal waveguide which extends along a travel path and has a predetermined, uniform speed of propagation of sound, and has a signal input coupler which is connected to a signal generator and is located on the movable object to couple an acoustic signal into the acoustic signal waveguide. In this case, signal output couplers are arranged at both ends of the acoustic signal waveguide and are each connected to a counter, the two counters being clocked by a clock generator and connected to a subtracter for the output signals from the two counters. The output signal from the subtracter, as a measure of the propagation—time difference of the acoustic signal coupled in from the point at which it is coupled into the signal output couplers, can be processed by an evaluation unit to form a signal which is representative of the instantaneous position of the movable object on the travel path, the signal input coupler operating with a signal spacing which is greater than the propagation time of sound from one end of the travel path to the other. If the movable object is at a standstill, standing waves can form, depending on the position of the object, as the result of reflections of the acoustic signal at the ends of the acoustic signal waveguide, and can lead to measurement problems as a result of fluctuations in amplitude.

SUMMARY OF THE INVENTION

It is an object of the invention to provide an apparatus for detecting the position of an object which can be moved along a prescribed path, with which it is possible to pick up measured values even when the object is at a standstill.

An apparatus for detecting the position of an object moveable along a predetermined travel path in accordance with the present invention comprises an acoustic signal waveguide extending along the travel path and having a predetermined, uniform speed of propagation of sound; a signal input coupler located on the moveable object to couple a clocked acoustic signal into the acoustic signal waveguide, at least one signal output coupler being arranged at one end of the acoustic signal waveguide and being connected to an evaluation unit for determining the propagation-time of the sound signal from a position at which it is coupled in to the at least one signal output coupler and, for generating a signal representative of the instantaneous position of the moveable object on the travel path, wherein the signal input coupler couples in, as acoustic signal, adjacent pulses having a varying time interval.

By varying the time intervals between successive pulses fed into the acoustic signal waveguide, it is possible to pick up valid measured values even in unfavorable stopping positions of the movable object. Since in this case, the standing wave is shifted as the result of variation of the repetition time, and thus evaluation outside the oscillation nodes of the said wave is made possible.

Further objects, embodiments and advantages of the invention will become apparent from the following description and the claims.

BRIEF DESCRIPTION OF THE DRAWINGS

The invention will be explained in more detail below with reference to a preferred embodiment illustrated schematically in the appended drawings.

FIG. 4 shows the structure of an option register relating to the microprocessor of FIG. 3.

DETAILED DESCRIPTION OF THE PREFERRED EMBODIMENT

Figure 1:
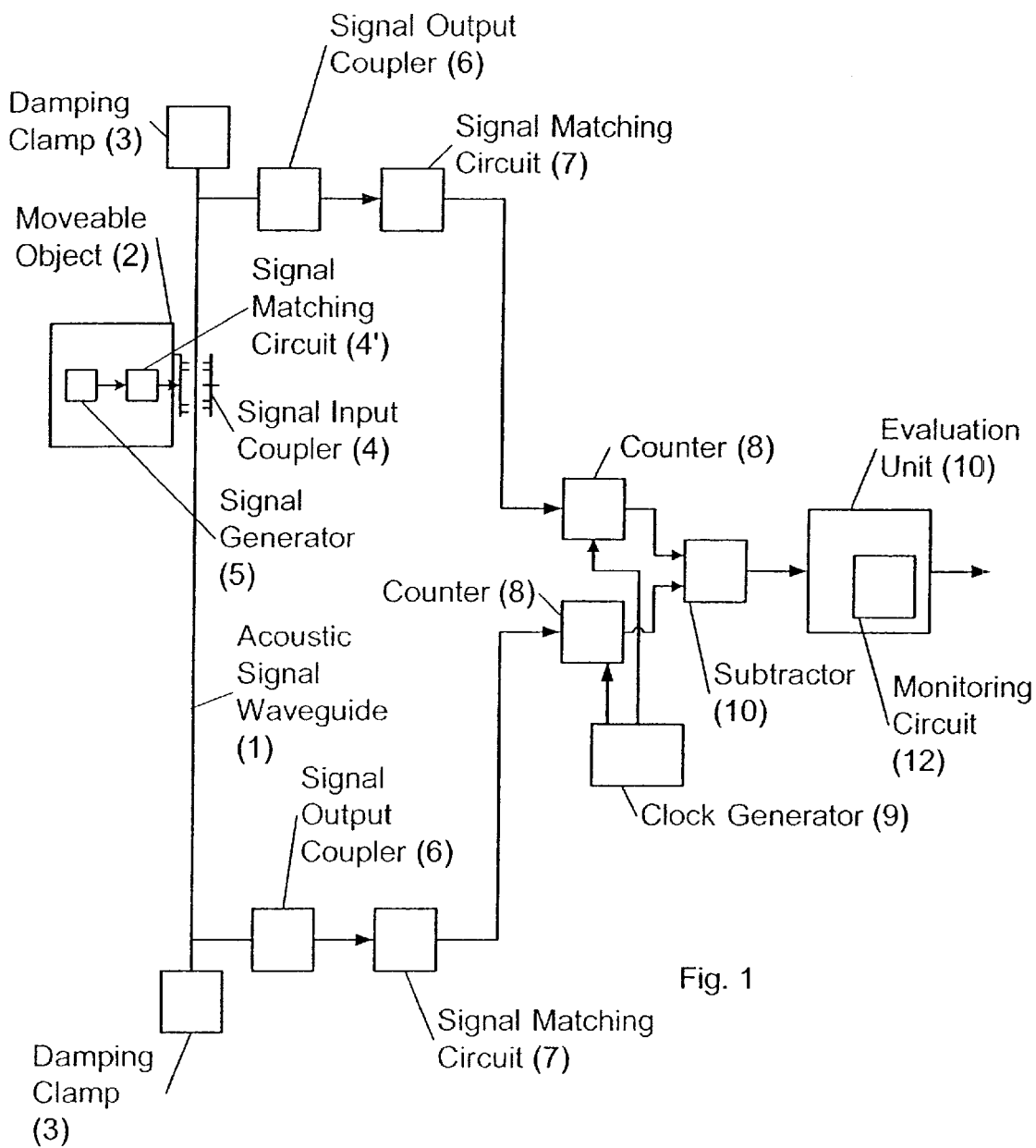
FIG. 1 shows, schematically, an embodiment of an apparatus for detecting position according to the invention.

The apparatus shown for detecting position, which can be used in particular for detecting the position of a lift cage, comprises an acoustic signal waveguide 1, for example, a steel rail or in particular a wire, which extends along a predefined travel path, along which a moveable object 2, for example, a lift cage, can be moved to and fro. The acoustic signal waveguide 1 having a predetermined, uniform speed of propagation of sound, is clamped or held in a damped manner at both ends in a damping clamp or mounting 3.

The moveable object 2 carries a signal input coupler 4 which is connected to a signal generator 5, for example, an oscillator, via a signal matching circuit 4'. The signal input coupler 4, which in particular operates inductively, couples an acoustic signal, which periodically includes synchronization pulses S received from the signal generator 5, into the acoustic signal waveguide 1. The synchronization pulses S have a clock period greater than the duration of the propagation of the acoustic signal from one end of the acoustic signal waveguide 1 to the other.

In addition, the signal input coupler 4 couples in additional pulses M, specifically a large number of additional pulses M, during each clock period of the synchronization pulses S. The clock period of the additional pulses M is such that a distance resolution needed, for example, for braking and for moving to an exact position of the object 2, is achieved in the direction of the travel path.

The synchronization pulses S are marked, that is to say, can be distinguished from the additional pulses M during the evaluation. The marking can be made, for example, by their clock period being an appropriate multiple of the clock period of the additional pulses M, and additionally, by their temporal offset in relation to the additional pulses M, for example, by one half clock period, of the pulse train generated by the signal generator 5 in the first line of FIG. 2. Then, a predetermined number of additional pulses M follows a synchronization pulse S in each case.

However, marking can also be made in another way, thus, the synchronization pulses S can be distinguished from the additional pulses M by modulation, pulse width, pulse height or the like.

The synchronization and additional pulses S, M to be coupled in may be short electromagnetic pulses, for example, simple pulses or pulse trains, or periodic frequency shift keying. The synchronization pulses S are used when the travel path is very long, for example, in lifts in multi-storey buildings, in which case the necessary distance resolution leads to new pulses being coupled into the acoustic signal waveguide 1 before a preceding pulse has reached the end of the signal waveguide 1.

A signal output coupler 6 is arranged in each case at the ends of the acoustic signal waveguide 1. This is preferably a piezoelectric signal output coupler 6, however, those operating inductively or capacitively can also be used.

Figure 2:
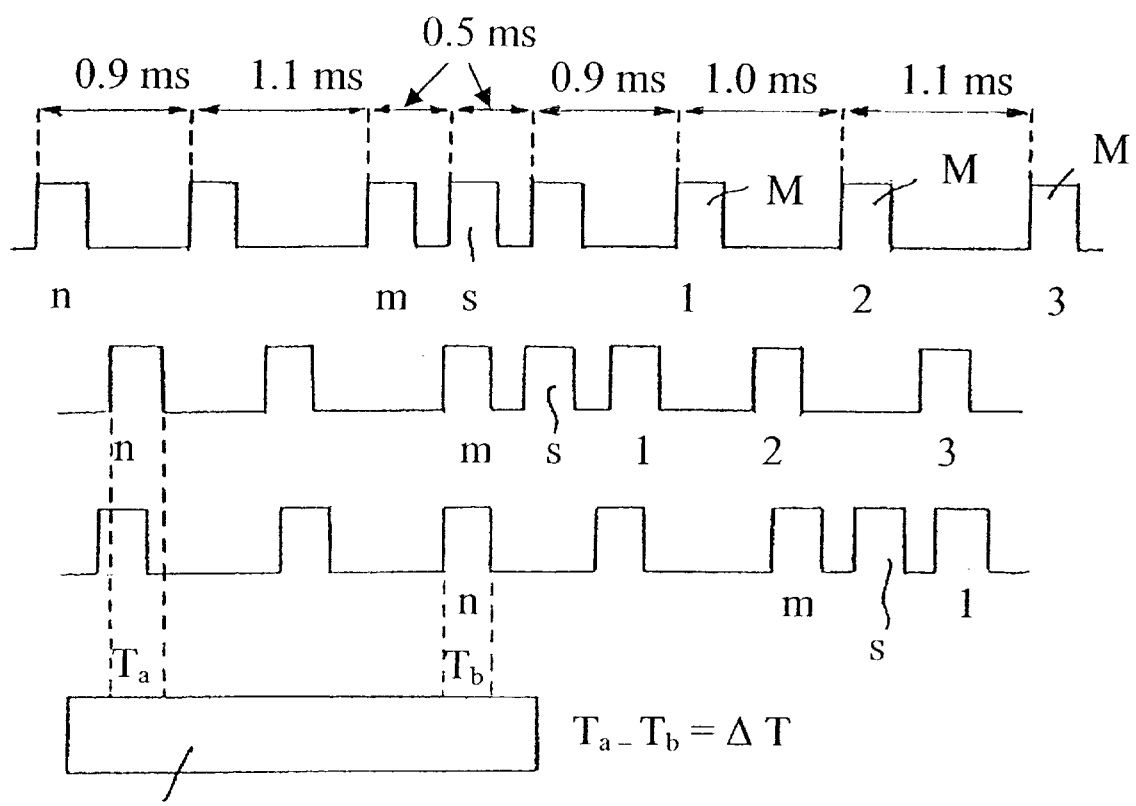
FIG. 2 shows a timing diagram relating to the signals of the apparatus from FIG. 1.

In order that the signal output coupler 6 can pick up an evaluable signal even when the object 2 is at a standstill, and therefore the signal generator 5 is in an unfavorable stopping position thereof, and does not operate in an oscillation node of a standing wave produced by reflection at the end of the acoustic signal waveguide 1, the additional pulses M are coupled in with a varying time interval, as emerges from the signal illustrated in FIG. 2 and fed into the acoustic signal waveguide 1. The time interval of the additional pulses M is expediently jittered by 0.1 ms, for example, around a mean value of, for example, 1.0 ms. This variation can be carried out in a predetermined sequence or else randomly, and preferably with a predetermined variability around the mean value.

Each signal output coupler 6 is connected to a signal matching circuit 7 whose output lines in each case lead to a counter 8. Both the counters 8 are clocked by a clock generator 9, and oscillator. The clock time of the clock generator 9 is considerably lower than the propagation time of the sound from one end of the acoustic signal waveguide 1 to the other and is selected in accordance with the desired measurement path resolution. The outputs from the counters 8 are fed to a subtracter 10, which forms the difference of the output signals of the counters 8 and feeds it to an evaluation unit 11, for example, a microprocessor where the output signal from the subtracter 10 is evaluated.

The synchronization pulses S are used to indicate to the evaluation unit 11 which following pairs of additional pulses belong to each other, namely the respective nth, that is to say the first, second, third and so on, additional pulses M arriving at the two signal output couplers 6 (designated by A and B in FIG. 2) at different times $T_a$ and $T_b$ following the respective synchronization pulse S, in order that the evaluation unit 11 can detect or determine the associated absolute time difference $T_a-T_b=\Delta T$ between associated additional pulses M, and hence the position of the object 2. The jittering of the additional pulses M has no influence on this since the time difference is absolute.

The evaluation, in order to detect the position, is primarily carried out in relation to the additional signals M, however, the synchronization pulses S can also be evaluated in this regard, specifically above all but not exclusively when the respective nth additional pulse is specially marked in order in this way to serve as a synchronization pulse S.

If the movable object 2 is located in the center between the signal output couplers 6, the outputs from the counters 8 are equal and their difference is zero. If the object 2 (in the case of a vertical path) is located above the center, the output from the counter 8 which is connected to the upper signal output coupler 6 is smaller than that of the other. From the propagation time difference of the additional pulses M belonging together in the acoustic signal waveguide 1, determined by the subtracter 10, and the known sound speed in the latter, there results the distance of the movable object 2 from the center. Since the difference would have a different sign if the movable object 2 were to be located below the center, it is also known whether the movable object 2 is located above or below the center, that is to say the exact position of the movable object 2 can thus be calculated. A digital or analog position signal which can be generated by the evaluation unit 11 can be used for tracking control.

A monitoring circuit 12 (watchdog) of the evaluation unit 11 can be used for the simple monitoring of the measurement path in the case of an input coupling which is constant over time of the input coupling signal. In the case of a contamination which is capable of damping the signal on the acoustic signal waveguide 1, the difference determined by the subtracter 10 exceeds a predetermined value, to which the monitoring circuit 12 responds in order to trigger a corresponding alarm signal or the like.

The speed of sound in an acoustic signal waveguide 1 made of steel is approximately 5300 m/s. In the case of a time resolution of 188 ns, for which a clock generator frequency of 5.3 MHz is necessary, the location resolution of the measurement path is about 1 mm.

Instead of being coupled to the signal generator 5, the signal input coupler 4 may be triggered by evaluation unit 11 to couple the acoustic signals into the signal waveguide 1. Instead, it is also possible that the signal input coupler 4 triggers the evaluation unit 11 via an electric signal to define the temporal start of each coupling of an acoustic signal into the signal waveguide 1 for the evaluation to be done by the evaluation unit 11.

Instead of the preferred provision of a signal output coupler 6 at each of the two ends of the signal waveguide 1, only one signal output coupler 6 provided at one of the ends of the signal waveguide 1 may be used.

Figure 3:
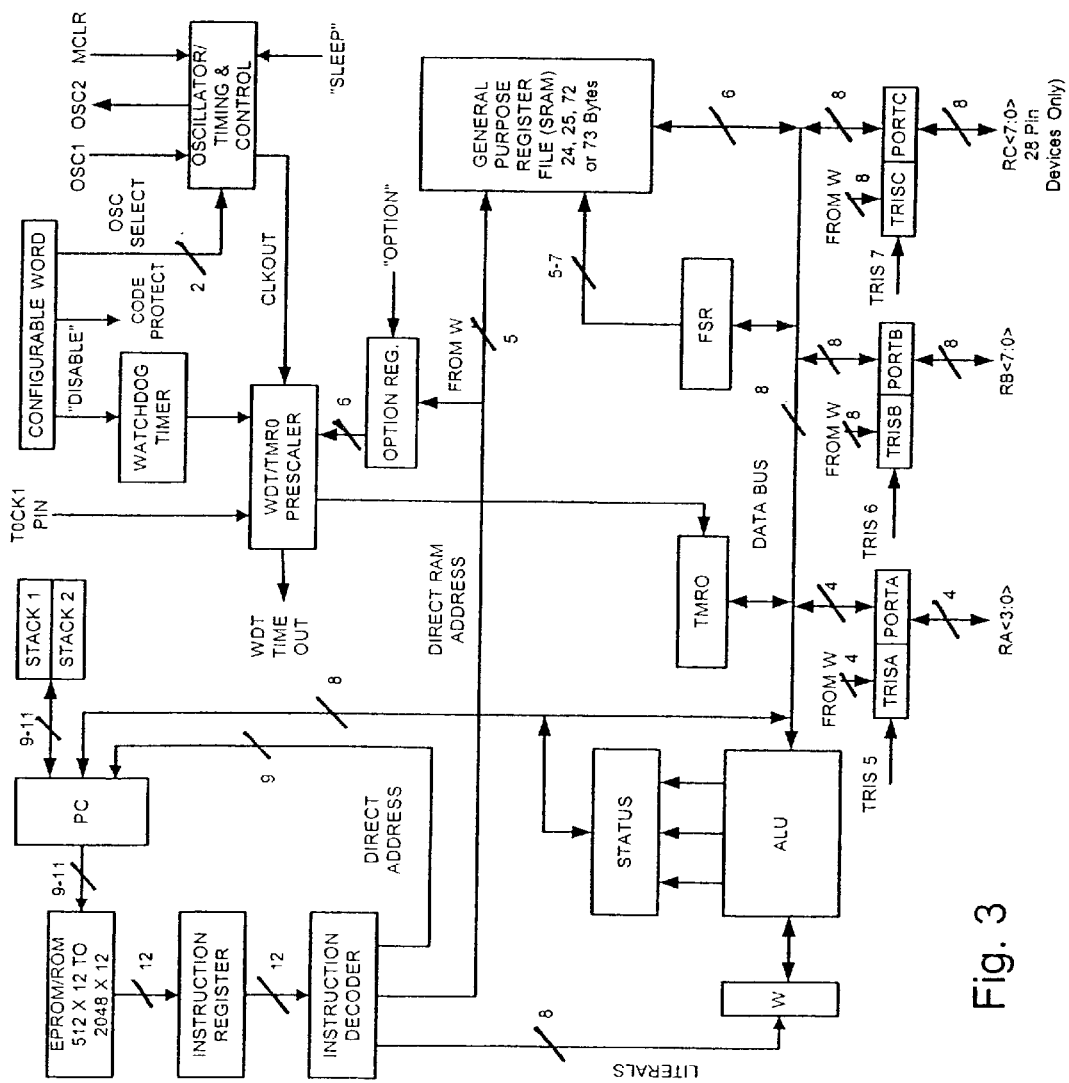
FIG. 3 shows a block diagram of a microprocessor, type 16C5x (manufactured by MICROCHIP), which may be used in connection with an ordinary pulse generator for the production of pulses having a varying time interval.

As mentioned before, the evaluation unit 11 can be a microprocessor which preferably at the same time may be used to provide adjacent pulses having a varying time interval can be realized by using a microprocessor in combination with a program located in the program storage of the processor. In FIG. 3 a block diagram of an example of a microprocessor (manufacturer MICROCHIP, type 16C5X) is shown which can be used for this purpose. The processor is supplied with a constant system tact, especially 4 MHz, by clock generator 9, for example, an external quartz resonator which sends a signal OSC1 to the processor. The processor contains a counting unit WDT/TMR0 PRESCALER which is supplied with the constant system tact or a tact which is the system tact divided by a constant factor. The tact is specified during operation of the configuration routine of the program stored in the program storage of the processor by setting or resetting corresponding flags (via the CONFIGURATION WORD) in the counting unit WDT/TRM0 PRESCALER.

The program controls a register OPTION REG (structure shown in FIG. 4) of the processor in such a way that an intern counter register TMR0 receives adequate time information having constant information length, whereby the time information is given as a predetermined value with respect to the tact of the stabile quartz clock of the oscillator. The intern counter register TMR0 is used to observe the expiration of predetermined time periods. One of the predetermined values according the duration of a predetermined time period is written into the intern counter register TMR0 and cyclically incremented in the determined tact while it is observed when the value of the intern counter register TMR0 reaches the value "00". When the value "00" is reached the corresponding predetermined time period has expired. Therefore, the expiration of the time period is given by the number of increments to obtain the value "00" and the stabile quartz tact which gives the frequency of incrementing the intern counter register TMR0. The values for the different time intervals between adjacent pulses are stored in a table located in the program storage of the processor.

Figure 5:
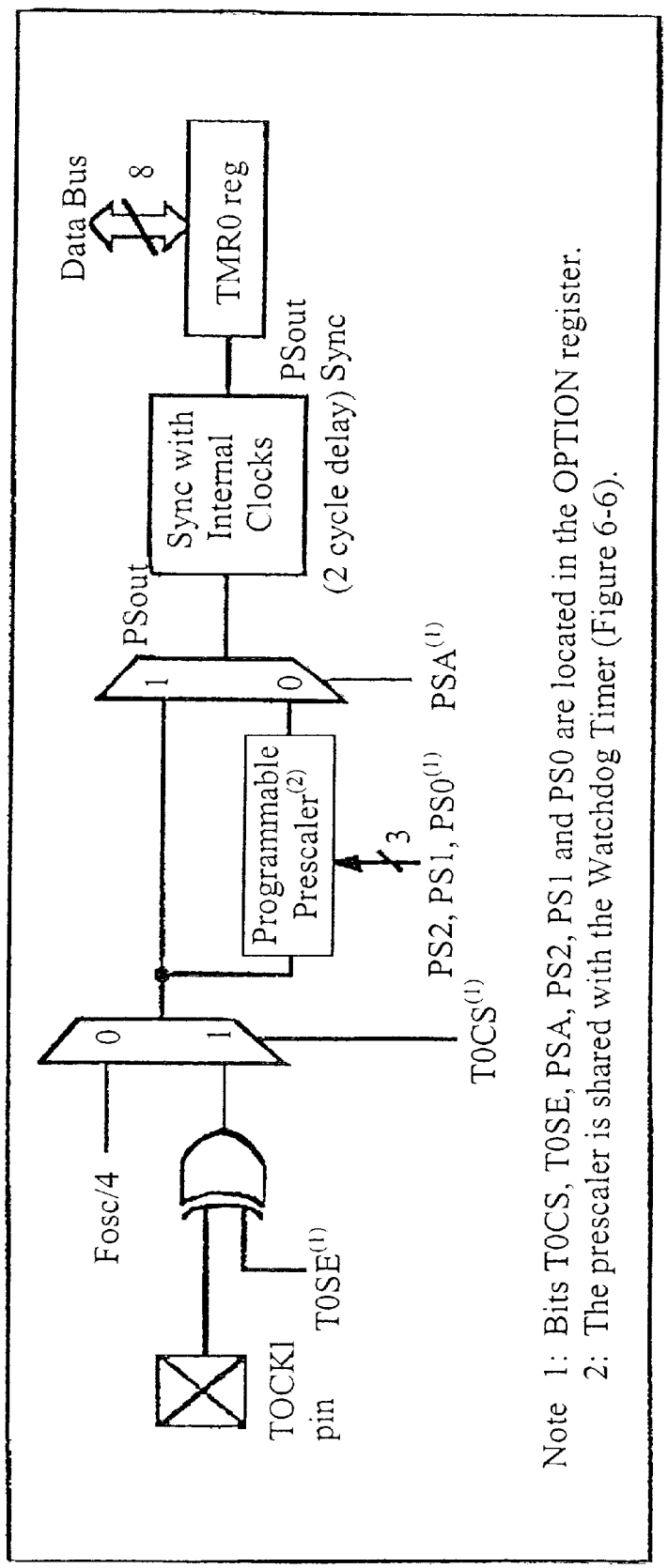
FIG. 5 shows a block diagram of an integrated pulse counting unit relating to the microprocessor of FIG. 3.

To illustrate, the following program operation, a block diagram of an integrated pulse counting unit of the processor, is shown in FIG. 5.

At the beginning of the program operation the program deletes a specific storage located in the processor's RAM (Random Access Memory). This specific storage will function as a pointer pointing at the beginning of the table located in the program storage containing in a predetermined order values according the duration of desired predetermined time intervals between adjacent pulses.

In the next step, the program defines a mark for a jump instruction, so that the program can return to this point after finishing the following program section.

Next, the processor sets a logical "1" at an output tap where the desired tact with variable time interval between adjacent pulses should be provided. A pulse (logical "1") with fixed duration time is started.

The output state of the logical "1" is used as a flag and the processor now writes a fixed binary number according to the desired pulse length in the intern counter register TMR0. While the content of the intern counter register TMR0 is cyclically incremented in the tact specified in the WDT/TMR0 PRESCALER, a program loop inquires whether the content of the intern counter register TMR0 is "00". By doing so, the fixed pulse duration time is derived from the stabile quartz tact of the oscillator in the processor via the number of increments necessary to obtain the value of "00" in the intern counter register TMR0.

When the value "00" is reached, the output of the processor is complemented by the program such that logical "1" is switched to logical "0" at the output tap.

The output state of the logical "0" is used as a flag and the processor now reads via the pointer pointing at a fixed area in the program storage in which the values for the variable time intervals are stored the binary number according to the desired interval time and writes it into the intern counter register TMR0.

In the case that the pointer already points to the last value in the table, before incrementing the value of the pointer, the pointer is set to "00". Otherwise, the pointer is incremented to point at the next value of the variable time intervals in the table.

Now, the program executes a loop by incrementing the intern counter register TMR0 register while inquiring whether the value "00" is reached. When "00" is reached and the pointer is not equal to "00", the program jumps to the jump point mark. The duration time for the time interval predetermined via the value in the program storage is over and the output is set to logical "1".

In the case that the pointer has reached the end of the table and the pointer has set to "00", the program can start again.

The different time intervals are stored in a table located in the program storage of the processor containing predetermined, already calculated fixed values in a predetermined order. For each time interval, a specific value is provided, therefore, each time interval can vary in its duration.

The query of the value of the intern counter register TMR0 is set to the value "00" because the processor has already intern a so-called "ZERO-FLAG" which is set by the processor in the case it recognizes the value "00" in the intern counter register TMR0. Therefore, this query is very fast and requires only one program step.

The values stored in the table for the time intervals are calculated with respect to the fact that during program execution the intern counter register TMR0 is incremented until the value "00" is obtained. The calculation of the values need only be done once before the start of the program.

While the invention has been shown and described with reference to a preferred embodiment, it should be apparent to one of ordinary skill in the art that many changes and modifications may be made without departing from the spirit and scope of the invention as defined in the claims.

What is claimed is:

1. An apparatus for detecting the position of an object moveable along a predetermined travel path, comprising:
   an acoustic signal waveguide extending along the travel path and having a predetermined, uniform speed of propagation of sound;
   a signal input coupler located on the moveable object, to couple a clocked acoustic signal into the acoustic signal waveguide;
   at least one signal output coupler being arranged at one end of the acoustic signal waveguide and being connected to an evaluation unit for determining the propagation-time of the sound signal from a position at which it is coupled in to the at least one signal output coupler and for generating a signal representative of the instantaneous position of the moveable object on the travel path; and
   a means for generating acoustic signal adjacent pulses having a varying time interval, said generating means being in communication with said signal input coupler.

2. The apparatus of claim 1, wherein the time interval fluctuates above and below by a constant amount from a mean value.

3. The apparatus of claim 1, wherein the acoustic signal couples in synchronization pulses with a clock period which is greater than the propagation time of sound from one end of the travel path to the other, and a plurality of additional pulses located in between, whose time interval from one another varies.

4. The apparatus of claim 3, wherein the synchronization pulses are marked with respect to the additional pulses.

5. The apparatus of claim 4, wherein the clock of the synchronization pulses is offset in time with respect to that of the additional pulses.

6. The apparatus of claim 3, wherein the synchronization pulses and the additional pulses are fed to the evaluation unit to determine the propagation-time difference.

7. The apparatus of claim 1, wherein a counter connected with the signal output coupler is clocked by a clock generator.

8. The apparatus of claim 7, wherein at each end of the signal waveguide a signal output coupler is provided, each of which being connected to a counter, said counters being connected to a subtractor for the output signals from the two counters.

9. The apparatus of claim 8, wherein the two counters are connected to a subtractor for the output signals from the two counters.

10. The apparatus of claim 7, wherein the clock generator for the counter operates at a minimum frequency which is needed for an envisaged measurement path resolution.

11. The apparatus of claim 1, wherein the signal output coupler is a piezoelectric output coupler.

12. The apparatus of claim 1, wherein the signal output coupler is a capacitive output coupler.

13. The apparatus of claim 1, wherein the signal output coupler is an inductive output coupler.

14. The apparatus of claim 1, wherein the acoustic signal waveguide is a metallic body extending along the travel path.

15. The apparatus of claim 14, wherein the acoustic signal waveguide is a metal rail.

16. The apparatus of claim 14, wherein the acoustic signal waveguide is a wire.

17. The apparatus of claim 1, wherein the signal input coupler is an inductive input coupler.

18. The apparatus of claim 1, wherein the movable object is a lift cage.

19. An apparatus for detecting the position of an object which can be moved along a predetermined travel path, having an acoustic signal waveguide extending along the travel path and having a predetermined, uniform speed of propagation of sound, and having a signal input coupler, which is connected to a signal generator and is located on the movable object, for coupling a clocked acoustic signal into the acoustic signal waveguide, signal output couplers being arranged at both ends of the acoustic signal waveguide and being connected in each case to a counter, the two counters being connected to an evaluation unit for determining the propagation-time difference of the acoustic signal coupled in from the point at which it is coupled in to the signal output couplers and for generating a signal that is representative of the instantaneous position of the movable object on the travel path, and a means for generating acoustic signal adjacent pulses having a varying time interval, said generating means being in communication with said signal input coupler.

20. The apparatus of claim 19, wherein the evaluation unit includes a monitoring circuit which triggers an alarm signal if the difference determined by the subtractor exceeds a predetermined value.

21. An apparatus for detecting the position of an object moveable along a predetermined travel path, comprising:

an acoustic signal waveguide extending along the travel path and having a predetermined, uniform speed of propagation of sound;

a signal input coupler located on the moveable object, to couple a clocked acoustic signal into the acoustic signal waveguide;

a signal generator which is located on the moveable object, in communication with the signal input coupler, and configured to generate acoustic signal adjacent pulses having a varying time interval; and at least one signal output coupler being arranged at one end of the acoustic signal waveguide and being connected to an evaluation unit for determining the propagation-time of the sound signal from a position at which it is coupled in to the at least one signal output coupler and for generating a signal representative of the instantaneous position of the moveable object on the travel path.

* * * * *